No. 695,081. Patented Mar. 11, 1902.
F. REESE.
AXLE.
(Application filed May 9, 1901.)
(No Model.) 2 Sheets—Sheet 1.
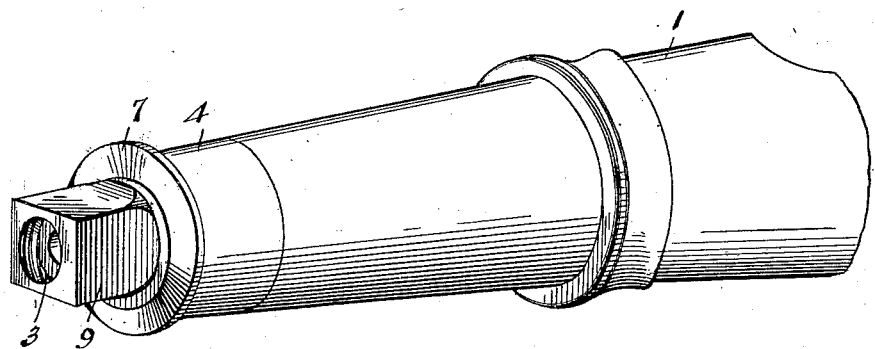
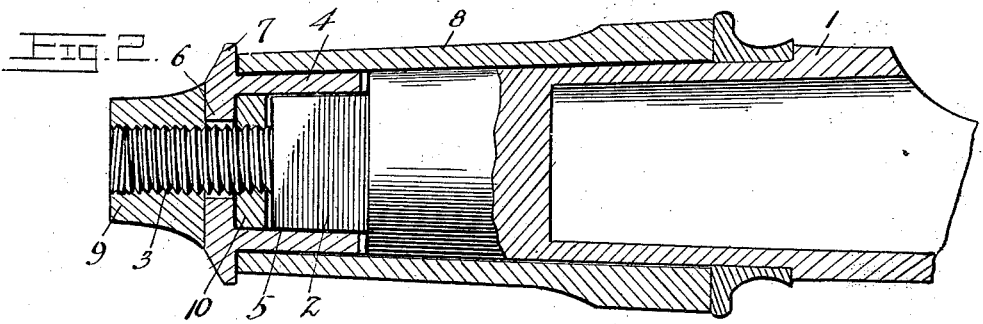
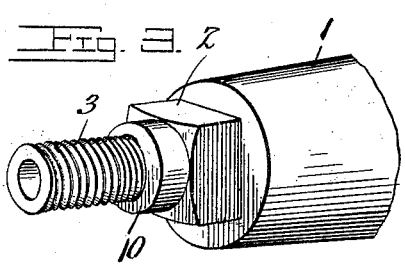
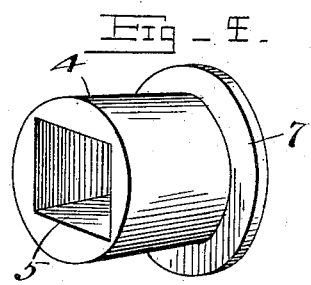
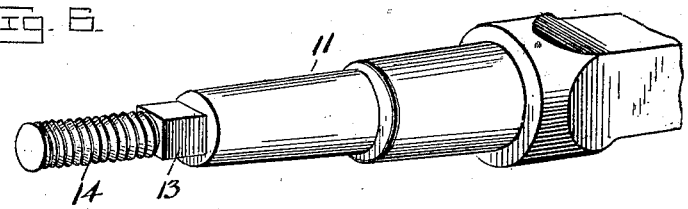
Witnesses
F. Reese, Inventor No. 695,081. Patented Mar. 11, 1902.
F. REESE.
AXLE.
(Application filed May 9, 1901.)
(No Model.) 2 Sheets—Sheet 2.

UNITED STATES PATENT OFFICE.

FREDERICK REESE, OF EUTAW, ALABAMA.

AXLE.

SPECIFICATION forming part of Letters Patent No. 695,081, dated March 11, 1902.

Application filed May 9, 1901. Serial No. 59,504. (No model.)

*To all whom it may concern:*

Be it known that I, FREDERICK REESE, a citizen of the United States, residing at Eutaw, in the county of Greene and State of Alabama, have invented a new and useful Axle, of which the following is a specification.

The invention relates to improvements in axles.

The object of the present invention is to improve the construction of axles and to provide a simple and efficient construction designed for use on various kinds of vehicles, such as light carriages and heavy wagons, and capable of enabling the wear to be readily taken up and of preventing the axle-nut from being accidentally unscrewed by the backing of a vehicle.

A further object of the invention is to provide an axle of this character in which the axle-nut will be prevented from locking the axle-box and interfering with the rotation of the wheel.

The invention consists in the construction and novel combination and arrangement of parts hereinafter fully described, illustrated in the accompanying drawings, and pointed out in the claims hereto appended.

Figure 5:
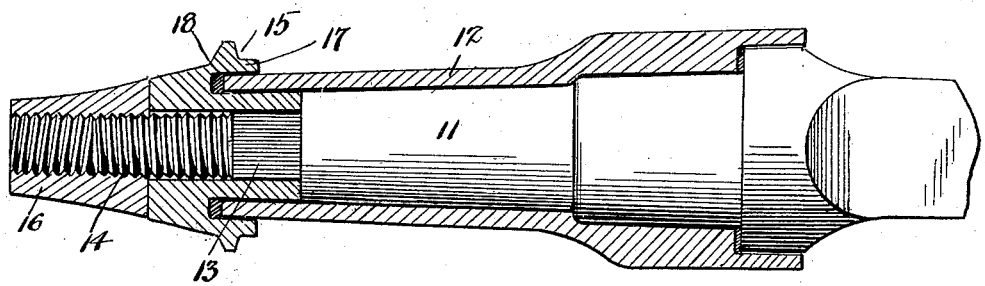
Figure 7:
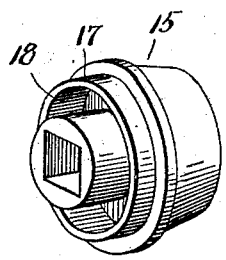

In the drawings, Figure 1 is a perspective view of a portion of an axle constructed in accordance with this invention and designed for use on heavy wagons. Fig. 2 is a longitudinal sectional view of the same. Fig. 3 is a detail perspective view of the outer end of the axle-skein, illustrating the arrangement of the adjustable collar for limiting the inward movement of the sleeve which engages the axle-skein. Fig. 4 is a similar view of the sleeve. Fig. 5 is a longitudinal sectional view of a portion of an axle designed for use on light buggies and similar vehicles. Fig. 6 is a detail perspective view of the spindle illustrated in Fig. 5. Fig. 7 is a detail view of the sleeve.

Like numerals of reference designate corresponding parts in all the figures of the drawings.

1 designates an axle-skein, designed to be arranged on the end of a wagon-axle in the usual manner and provided at its outer end with a polygonal portion 2, located at the inner end of the threaded portion 3 and adapted to receive a sleeve 4. The polygonal portion 2, which is formed by reducing the axle-skein, is preferably rectangular in cross-section, and the sleeve 4 is provided with an opening 5, conforming to the configuration of the polygonal portion 2 and adapted to interlock with the same, and it is capable of being readily removed and partially rotated to bring different portions of it at the bottom, where the wear is the greatest, whereby the wear will be uniformly distributed over the sleeve. The sleeve 4 is provided at its outer end with inwardly and outwardly extending annular flanges 6 and 7, the outer flange 7 being arranged to abut against the axle-box 8 and being interposed between the same and the axle-nut 9, whereby the rotation of the wheel when backing a vehicle will be prevented from unscrewing the axle-nut. The axle-nut, which is threaded in the usual manner to engage the threaded portion of the axle skein or spindle, abuts against the outer end of the sleeve 4, which is capable of longitudinal adjustment to take up the wear on the axle-box.

The inwardly-extending annular flange 6 of the sleeve 4 abuts against an adjustable collar 10, arranged on the inner portion of the threaded end of the axle-skein and provided with interior screw-threads for engaging the same. This threaded collar forms an abutment for and limits the inward movement of the sleeve and prevents the same from locking the axle-box. The inwardly-extending annular flange forms a circular opening for the reception of the threaded end of the skein.

In Fig. 5 of the accompanying drawings is illustrated a slight modification of the construction shown in Figs. 1 to 4, inclusive, to adapt the invention for use on a light axle for carriages and the like. The spindle 11, which may be provided with any suitable bearing-surface, receives an axle-box 12 in the usual manner, and it has a reduced polygonal portion 13, located at the inner end of its threaded portion 14 and receiving an adjustable sleeve 15, which is interlocked with the axle to prevent the backward rotation of the wheel from unscrewing the axle-nut 16. An adjustable collar may, if desired, be employed in this form of the invention; but it is preferably omitted, as the inner end of the sleeve may be readily dressed to reduce the length of the sleeve to advance the engaging portion of the same on the axle. The sleeve, which is adapted to be adjusted or partially rotated to bring different portions of its surface at the bottom, is provided with an outer annular flange 17, overhanging the inner portion of the sleeve and forming an annular recess 18 for the reception of the outer end of the axle-box. The recess is adapted to receive a suitable washer, and the outer annular flange 17 operates to exclude dust from the bearing. The nut is arranged on the threaded portion of the spindle and engages the sleeve.

It will be seen that the axle is simple and comparatively inexpensive in construction, that it enables wear and lost motion to be readily taken up, and that effective means are provided for preventing the backward rotation of a wheel from unscrewing the axle-nut.

What I claim is—

1. The combination of a spindle having a threaded outer end and provided adjacent to the same with a polygonal portion, an axle-box, an axle-nut, and a longitudinally-adjustable sleeve arranged on the polygonal portion of the axle at the outer end of the axle-box and extending longitudinally thereof and limiting the inward movement of the axle-nut, said sleeve when removed being adapted to be partially rotated to bring different portions of its surface at the top of the spindle, substantially as described.

2. The combination of an axle provided with a polygonal portion arranged at the inner end of its threaded portion, an axle-box, an adjustable sleeve arranged on the polygonal portion of the axle at the outer end of the axle-box, a threaded collar arranged within the sleeve and engaging the axle and forming an abutment for the said sleeve, and an axle-nut, substantially as described.

3. The combination of an axle provided with a reduced polygonal portion located at the inner end of the threaded portion, a sleeve located at the outer end of the axle and having a polygonal opening to fit the polygonal portion of the axle and provided with inner and outer annular flanges, the outer annular flange being arranged to engage an axle-box, an adjustable collar arranged on the threaded portion of the axle and engaging the inner flange, and an axle-nut, substantially as described.

In testimony that I claim the foregoing as my own I have hereto affixed my signature in the presence of two witnesses.

FREDERICK REESE.

Witnesses:
 HUNTER COLE,
 W. A. GORDON.